April 5, 1966     J. T. CABBAGE     3,244,756
ALUMINUM HALIDE COMPLEX CATALYST CONDITIONING
Filed Jan. 2, 1962
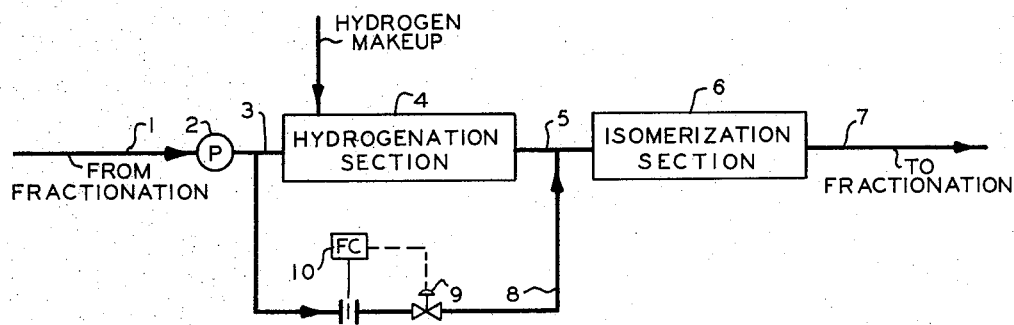
INVENTOR.
J.T. CABBAGE
BY *Young & Jugg*
ATTORNEYS United States Patent Office 3,244,756
Patented Apr. 5, 1966

3,244,756
ALUMINUM HALIDE COMPLEX CATALYST
CONDITIONING
John T. Cabbage, Bartlesville, Okla., assignor to Phillips Petroleum Company, a corporation of Delaware
Filed Jan. 2, 1962, Ser. No. 163,576
7 Claims. (Cl. 260—666)

This invention relates to the conditioning of an aluminum halide-hydrocarbon complex catalyst. In one of its aspects the invention relates to the conditioning of aluminum halide-hydrocarbon complex catalyst by insuring that there is present during its use in a reaction zone, for example an isomerization reaction zone, wherein hydrocarbons are isomerized, a small quantity of at least one of benzene and/or sulfur. In another of its aspects the invention relates to an apparatus comprising in combination means for pre-treating catalytically a feed to an isomerization or hydrocarbon conversion zone, means for effecting a hydrocarbon conversion or isomerization reaction, means for settling effluent containing aluminum halide-hydrocarbon complex catalyst obtained from said means for effecting a conversion, and means for by-passing a controllable amount of feed around the means for pre-treating. In a specific embodiment of the apparatus of the invention the means for by-passing feed around the means for pre-treating is operated or controlled responsive to the rate of settling of the aluminum halide-hydrocarbon complex catalyst in the settling means.

In the operation of a conversion zone employing an aluminum halide-hydrocarbon complex catalyst, for example as in the operation of an isomerization of hydrocarbons zone, it is necessary to pass the catalyst and converted hydrocarbons together to a settling zone. In this settling zone the catalyst settles from the hydrocarbon phase which is decanted and the catalyst is then recycled for reuse. Aluminum halide-hydrocarbon complex catalyst has been used for the conversion of hydrocarbons as in isomerization of normal hydrocarbons to their isomers, e.g., butane to isobutane. It is also used to isomerize methylcyclopentane and normal hexane to cyclohexane and isohexanes respectively. Other conversions with the catalyst here discussed are known to one skilled in the art and this invention applies generally to the conditioning of such catalysts. Describing the invention, now, with respect to the aluminum halid complex catalytic isomerization of methylcyclopentane and normal hexane, it has been found that when a highly reduced nickel catalyst was installed in the hydrogenation pre-treater ahead of the isomerization section of the unit in which methylcyclopentane and normal hexane were being isomerized with aluminum halide-complex catalyst that the settling rate of the isomerized hydrocarbon-catalyst mixture became much slower than usual. It was also found that most of the reaction in the nickel catalyst bed was taking place in the top foot-or-two of the bed. It was then found that feed reaching isomerization zone had been exhaustively treated for removal of benzene and/or sulfur and further reason that, possibly, this benzene and/or sulfur was necessary to insure a conditioning or a condition of the aluminum halide-hydrocarbon complex catalyst which would cause it to settle more rapidly. Accordingly, it was conceived that a small by-pass line be placed around the hydrogenation section to allow a controllable small quantity of feed to by-pass this unit and to go directly to isomerization while controlling the amount of the by-passed feed to obtain desirable settling properties on the complex.

An object of this invention is to condition an aluminum halide complex hydrocarbon catalyst to insure its more rapid settling from a converted hydrocarbon which it has been used to prepare. Another object of this invention is to provide an improved isomerization operation in which feed to the isomerization is pre-treated to remove hydrogenatable impurities therefrom.

Other aspects, objects, and the several advantages of this invention are apparent from a study of this disclosure, the drawing and the appended claims.

According to the present invention, an aluminum halide-hydrocarbon complex catalyst is conditioned during a conversion operation in which it is employed to convert a hydrocarbon, for example in isomerization of a hydrocarbon, as herein described, by having present during the catalytic conversion in the catalyst a small controlled amount of at least one of benzene and/or sulfur. The amount of benzene in the feed according to the invention is maintained in the range 0.002–0.10 percent by volume of the feed to insure a rate of settling such that throughput need not be reduced as it otherwise has had to be reduced when hydrogenating to remove benzene and/or sulfur from the isomerization section feed.

Thus, while it has been known in the art to remove benzene from a feed to an isomerization of hydrocarbons, for example, a mixture of hydrocarbons which have been separated from gasoline which has been produced by a conventional reforming operation and which contain methylcyclopentane, normal hexane, etc., the removal of the benzene in the feed has been practiced because the presence of benzene in the feed to a synthesis plant increases consumption of the synthesis catalyst. Further, the benzene inhibits some of the desirable reactions by an uneconomical amount. Thus, in the past it has been known to remove benzene from the feed stock to certain catalysts to obtain greater yields of desirable products from the synthesis plant with lower catalyst consumption and, therefore, lower and more attractive operating costs. When using aluminum chloride-type catalyst it has been known to add an aromatic such as benzene or durene to minimize a cracking effect of such type catalyst. The quantities advocated to be used range from 0.4 to 15 mol percent based on feed stocks. Such an amount of benzene is much too high causing loss of catalyst in the isomerization operation.

The benzene-containing fresh feed charged to the benzene hydrogenation system usually contains in excess of 4 volume percent benzene, which is about the maximum amount of benzene which can be tolerated in this (using nickel on kieselguhr catalyst) type of hydrogenation process. To insure that no more than about 4 volume percent benzene is in the feed to hydrogenation, a diluent (not shown in the drawing) such as a recycle of substantially benzene-free, and hydrogen-free, hydrogenation reactor effluent is used. When the hydrogenation zone effluent (after removal of hydrogen therefrom for recycle thereof, not shown, to the hydrogenation zone) which is charged to the aluminum halide-complex type catalytic isomerization process contains above about 0.10 volume percent benzene, catalyst is lost; and when it contains below about 0.002 volume percent benzene, an emulsion or difficulty settleable mixture of converted hydrocarbon and catalyst is obtained.

Thus the specific problem which this invention solves is that of an emulsion or slow breaking mixture of catalyst complex and hydrocarbon and the solution is obtained by maintaining benzene in the hydrocarbon feed to isomerization in the range of about 0.002–0.10 volume per ment.

It is within the scope of the invention to add benzene to the completely hydrogenated feed stock before it is passed to isomerization. It is further within the scope of the invention to add aromatics other than benzene.

Referring now to the drawing, a mixture of methyl cyclopentane and normal hexane passes by 1 and pump 2 through 3 into hydrogenation section 4 and by 5 from hydrogenation section 4 to isomerization section 6 and from isomerization section 6 by 7 to fractionation, not shown for sake of simplicity. In hydrogenation section 4 the feed which contains benzene and/or some sulfur and/or sulfur compounds is hydrogenated to protect the aluminum halide-hydrocarbon complex catalyst which is used in isomerization section 6. In order to insure the proper rate of settling after isomerization a small quantity (about 1 gallon per hour for a fresh feed of 260 barrels per hour containing about 8 volume percent benzene) is by-passed around hydrogenation section 4 by by-pass 8, the amount of the by-pass being controlled by valve 9 responsive to flow recorder controller 10.

It will be understood by one skilled in the art in possession of this disclosure that in the isomerization section there is an isomerization reaction zone as well as a settling zone. Catalyst which settles in the settling zone is pumped back to the reaction zone with treatment, removal of catalyst and addition of make-up catalyst, as earlier described and as are well known in the art.

*Example*

In the isomerization of methylcyclopentane and normal hexane pumping approximately 260 barrels per hour of this fresh feed containing about 8 volume percent benzene through a hydrogenation section and then through an isomerization section containing aluminum chloride-hydrocarbon complex catalyst presently used in the art for the isomerization of such a feed catalyst settling rate is satisfactory until a highly reduced nickel catalyst is installed in the hydrogenation pre-treater. It is then found that charge to the system has to be reduced by about 20 percent because the settling quality of the isomerization complex catalyst begins to deteriorate. Thus, it is found impossible to keep the catalyst in the system because it will go out with the decanted hydrocarbons from the settler. This is why the feed rate has to be reduced by about 20 percent. However, upon adding benzene to the feed to the isomerization section and maintaining the amount added in the range 0.002–0.10 (approximately), e.g., by by-passing about 0.25 to 1.25 volume percent of the fresh feed around the hydrogenation zone which will maintain benzene in said range, it is found that the rate of pumping of feed can be increased and that the settling rate of the catalyst complex is so greatly improved that the original feed rate can be maintained.

It will be seen that while it is desirable to reduce the amount of benzene and/or sulfur in the feed to the isomerization unit or reaction zone, it is nevertheless desirable to maintain a relatively small but definite quantity of benzene and/or sulfur in the feed to the isomerization zone to insure a proper rate of settling of the catalyst to avoid catalyst loss. When the benzene is in the range of 0.002–0.10 volume percent of the feed, the sulfur content, calculated as sulfur, will be in the approximate range 4–20 parts per million of the feed to the isomerization zone. Avoiding the catalyst loss insures a reasonable throughput, as evident from a study of this disclosure.

The aluminum halide-hydrocarbon complex catalyst which is here under consideration can be prepared by known methods. The catalyst is known as a Friedel-Crafts type catalyst but modified to the extent that there is actually formed, either beforehand or in situ, a complex between a hydrocarbon such as a paraffinic hydrocarbon and the aluminum halide or aluminum chloride. The catalyst employed in carrying out the isomerization reaction comprise metal halides, such as aluminum chloride, and aluminum bromide. These catalyst are especially effective when present as complexes which are formed by interaction between the metal halides and hydrocarbons present in the reaction system. A particularly desirable isomerization catalyst is the complex of hydrocarbon with aluminum chloride. In addition to the catalyst, it is desirable that the corresponding hydrogen halide be present in the reaction zone since this material maintains catalyst activity at a high level. The reaction rate and the conversion of the hydrocarbon feed is dependent on the amount of aluminum chloride in the aluminum chloride-hydrocarbon complex. Thus, to maintain a normal hexane conversion of about 55 percent, the catalyst complex should contain 60 to 62 percent aluminum chloride. However, the quantity of aluminum chloride in the complex can be varied over wide ranges to provide a corresponding range of feed reactant conversion. While the over-all activity of the catalyst is established by the aluminum chloride content, as stated, the presence of hydrogen chloride is required to provide a high activity. Usually the quantity of hydrogen chloride present is between about 2 and about 6 weight percent of the feed with about 4 weight percent being preferred. The hydrocarbon-to-catalyst ratio is also an important factor in the isomerziation reaction rate and generally this ratio is maintained between about 0.8:1 and about 1.4:1 although ratios as high as 5 to 1 can be used if reaction temperatures are increased.

The isomerization of normal hexane and methylcyclopentane in the method of this invention is carried out usually at a temperature of between about 90° F. and about 160° F., the particular temperature employed being dependent on the composition of the material to be converted. The isomerization reaction is preferably carried out under sufficient pressure to provide a liquid phase reaction, namely a pressure in the range of between about 150 and 300 p.s.i.g. The contact or residence time of the reactants in the reactor varies usually between about 0.1 and about 5 hours.

Reasonable variation and modification are possible within the scope of the foregoing disclosure, drawing, and the appended claims to the invention the essence of which is that a small amount in the given range of benzene and/or sulfur is maintained in the feed to a hydrocarbon conversion or isomerization zone to insure rapid settling of the aluminum halide-hydrocarbon complex catalyst used therein.

I claim:

1. A method of isomerizing a hydrocarbon which comprises passing a hydrocarbon feed containing the same and at least one of benzene and one sulfur into a hydrogenation pre-treating zone wherein the feed is hydrogenated to remove any benze and sulfur therefrom, passing the thus hydrogenated feed to an isomerization zone, in the isomerization zone isomerizing said feed in the presence of an aluminum halide-hydrocarbon complex catalyst, and by-passing a small portion of the feed around the pre-treating zone into the isomerization zone in an amount only which is effective to maintain a proper rate of settling of the converted hydrocarbon and aluminum halide-hydrocarbon complex catalyst when the effluent from the isomerization zone is passed to a settling zone, and passing the effluent from the isomerization zone to a settling zone.

2. A method for the conversion of methylcyclopentane and normal hexane by isomerization to cyclohexane and isohexanes which comprises passing a feed containing methylcyclopentane and normal hexane to a hydrogenation pretreating zone wherein any benzene and any sulfur is hydrogenated in said feed, then passing said feed to an isomerization wherein it is isomerized in the presence of an aluminum halide-hydrocarbon complex catalyst, by-passing a small portion of the feed around said hydrogenation pre-treating zone into said isomerization zone, passing effluent from the isomerization zone to a settling zone wherein hydrocarbon and catalyst are separated into two phases, and controlling the amount of benzene and any sulfur by-passed around said hydrogenation pre-treating zone to accomplish a desired rate of settling in said settling zone.

3. A method according to claim 2 wherein the amount of feed by-passed is in the approximate range 0.25–1.25 volume percent.

4. In the isomerization of a hydrocarbon employing an aluminum halide-hydrocarbon complex catalyst, the process which comprises feeding to an isomerization zone, together with the hydrocarbon to be converted therein, sulfur in an amount in the approximate range 4–20 parts per million, calculated as sulfur.

5. In the isomerization of a hydrocarbon selected from the group consisting of methylcyclopentane and normal hexane employing an aluminum halide-hydrocarbon complex catalyst, the process which comprises feeding to a conversion zone, together with the hydrocarbon to be converted therein, at least one of benzene and sulfur in an amount in the approximate range of 0.002–0.10 percent by volume of benzene based on the feed, and when sulfur is present, the sulfur, calculated as sulfur, being in the approximate range 4–20 parts per million.

6. In the isomerization of a hydrocarbon employing an aluminum halide-hydrocarbon complex catalyst wherein the hydrocarbon feed is pre-treated to remove therefrom substantially all of any benzene and any sulfur contained therein prior to the isomerization, the improvement which comprises feeding to a conversion zone together with the pre-treated feed to be isomerized therein, at least one of benzene and sulfur in an amount in the approximate range of 0.002–0.10 percent by volume of benzene based on the feed, and when sulfur is present, the sulfur, calculated as sulfur, being in the approximate range 4–20 parts per million.

7. A method for the conversion of methylcyclopentane and normal hexane by isomerization to cyclohexane and isohexanes which comprises passing a feed containing methylcyclopentane and normal hexane to a hydrogenation pre-treating zone wherein any benzene and any sulfur is hydrogenated in said feed, employing a reduced nickel catalyst, then passing said feed to an isomerization wherein it is isomerized in the presence of an aluminum halide-hydrocarbon complex catalyst, by-passing a small portion of the feed around said hydrogenation pre-treating zone into said isomerization zone, passing effluent from the isomerization zone to a settling zone where hydrocarbon and catalyst are separated into two phases, and controlling the amount of benzene and any sulfur by-passed around said hydrogenation pre-treating zone to accomplish a desired rate of settling in said settling zone.

References Cited by the Examiner
UNITED STATES PATENTS

| | | | |
|---|---|---|---|
| 2,393,569 | 1/1946 | Ross et al. | 252—442 |
| 2,415,733 | 2/1947 | D'ouville | 260—683.74 |
| 2,766,302 | 10/1956 | Elkins | 260—666 |
| 2,898,347 | 8/1959 | Hillyer et al. | 260—666 X |
| 2,953,606 | 9/1960 | Dean et al. | 260—666 |
| 2,999,890 | 9/1961 | Davison | 260—666 |
| 3,009,002 | 11/1961 | Kron | 260—666 X |
| 3,085,123 | 4/1963 | Ridgeway | 260—683.75 |

DELBERT E. GANTZ, *Primary Examiner.*

ALPHONSO D. SULLIVAN, PAUL M. COUGHLAN,
*Examiners.*